Figure 1:
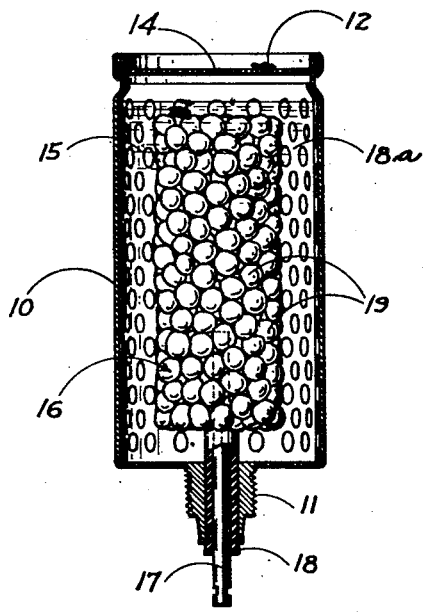

Aug. 27, 1946.   J. B. BRENNAN   2,406,345
ELECTRODE AND METHOD OF MAKING SAME
Filed April 15, 1942

INVENTOR.
JOSEPH B. BRENNAN
BY
ATTORNEYS.

Patented Aug. 27, 1946

2,406,345

UNITED STATES PATENT OFFICE 2,406,345

ELECTRODE AND METHOD OF MAKING SAME

Joseph B. Brennan, Bratenahl, Ohio

Application April 15, 1942, Serial No. 439,141

14 Claims. (Cl. 175—315)

This invention relates to electrolytic devices such as electrolytic condensers, rectifiers, storage batteries and the like. The invention is described herein with reference to electrolytic condensers of the type embodying anodes of film-forming metal such as aluminum and similar maintaining electrolytes, but it is to be understood that the invention is not limited in its application to this type of device, but may be used advantageously in conjunction with various other types of electrolytic devices.

In my prior Patent No. 2,104,018 I have disclosed and claimed electrodes having surfaces composed of minute cohering particles of film-forming metal, these electrodes being particularly adapted for electrolytic condensers. As noted in my said patent, such electrodes are very advantageous in that they have a large effective area because of the roughened and porous character of the spray-deposited layers. In the present application I employ substantially the same sort of spray-deposited layers, but the base material is of novel character. It is among the objects of the present invention to provide compact and efficient electrodes for electrolytic devices wherein a large amount of surface can be obtained by the use of a minimum amount of metal. A further object is to provide such a device that can be manufactured economically and rapidly and to provide efficient and economical methods of manufacturing such devices. Another object is to provide an electrode consisting of a porous mass of large effective area. Another object is to provide such an electrode in which the base material is heat resistant and will not contaminate the electrolyte.

Briefly, I accomplish the above and other objects of my invention by forming the electrodes from a comparatively large number of pieces or pellets of a suitable base material, each of the pellets having its surface sprayed as described in my patent aforesaid to provide conductive spray-deposited metallic layers thereon. The sprayed pellets are then assembled to form a mass and may be retained in contact with each other either by mechanical means or by sintering the mass so that the contacting portions of the metallic surface of the several pellets adhere to each other thus providing a porous mass having a very extensive conductive metallic surface in and through the mass.

Various materials may be employed both for the base material of the pellets and for the sprayed metal. The pellets may be produced economically from porcelain, glass, burnt clay products, various synthetic resins such as resins of the phenol formaldehyde type, and other similar materials, it being desirable that the pellets be of low cost materials but resistant to the heat used in the sintering operation and substantially insoluble in the electrolyte, or at least free from soluble contaminating substances. Metallic oxides compressed to form porous pellets may be employed, aluminum oxide being suitable for electrolytic condensers. The spray-deposited layers can be composed of different metals and alloys. In the case of electrolytic condensers I preferably employ aluminum of high purity; for storage cells of the Edison type the sprayed coatings may be of nickel. Other metals may be used advantageously depending upon the nature of the device in which the electrode is to be incorporated.

Figure 4:
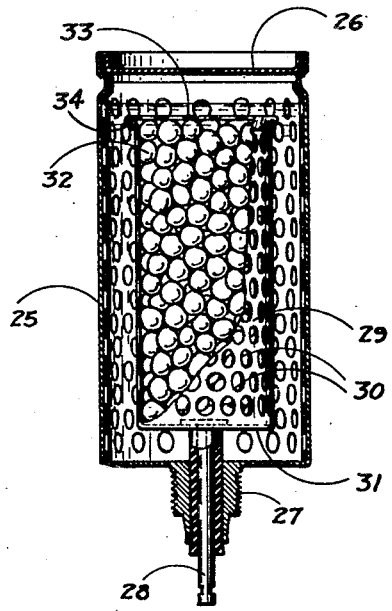
Figure 2:
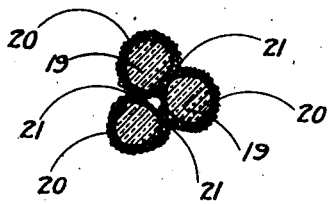
Figure 3:
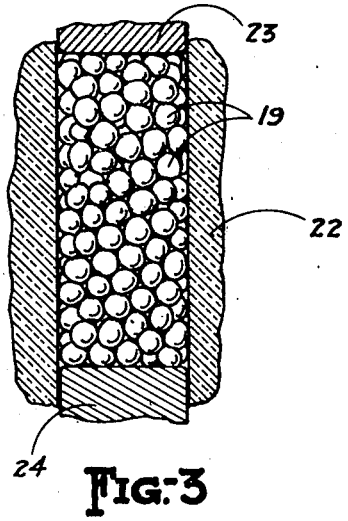

Referring to the drawing in which I have illustrated preferred forms of my invention particularly as applied to electrolytic condensers, Figure 1 is a vertical section through one type of condenser embodying my invention; Figure 2 is a sectional detail on an enlarged scale illustrating a few of the pellets making up the electrode of Figure 1; Figure 3 diagrammatically illustrates one method of sintering together a number of pellets to produce the electrode mass, and Figure 4 is a vertical section through a modified form of condenser embodying my invention.

As shown in Figure 1 my invention may be applied to condensers of generally conventional construction such as the wet type of condenser illustrated. This condenser may comprise a suitable container for electrolyte 10 which also acts as the cathode of the condenser. The bottom of the container is provided with a depending neck portion 11, while the top is closed by a cap 12 having a suitable vent 14 therein. A suitable film-maintaining electrolyte 15 is disposed within the container while the anode, indicated generally at 16, is immersed in the electrolyte. The anode may be supported in more or less conventional manner by a riser 17 extending downwardly through the neck portion 11 and held therein and spaced therefrom by the rubber sleeve 18. The electrode is prevented from accidentally coming into contact with the inner walls of the cathode 10 by the perforated spacer 18a.

To provide an economical electrode having a very large surface area and a correspondingly great capacity, the electrode 16 is made up of a large number of pellets 19 which, as shown in an enlarged scale in Figure 2, are each provided with a spray-deposited coating 20 or aluminum or other suitable film-forming metal or alloy. The pellets may be composed of any of the materials heretofore mentioned but porcelain or glass are particularly suitable inasmuch as they are inexpensive, are resistant to heat and will not dissolve in or contaminate the electrolyte. The pellets may be approximately spherical as shown, in which case they may be produced in the manner of marbles or beads or they may be broken fragments of the material. In either event, I prefer that the pellets in electrolytic condensers provided with conventional containers and electrolytes be of from $\frac{1}{16}$ inch to $\frac{1}{4}$ inch in diameter or thickness and that the pellets in each electrode be of substantially the same size so that the porous character of the electrodes will be preserved. Generally speaking, higher voltage condensers may require larger pellets, to provide correspondingly bigger passageways within the electrodes.

The pellets may be sprayed by well-known methods and apparatus such as that described in my patent aforesaid to dispose porous conductive coatings of finely divided metallic particles thereon, the spray-deposited coatings or layers preferably being on the order of about three-thousandths of an inch in thickness. The pellets themselves are thus large as compared to the thickness of the spray deposited layers, and are many times the size of the minute metallic particles making up the spray deposited coatings.

In the arrangement shown in Figure 1 the electrode consists of a mass of pellets in which the spray-deposited layers on the individual pellets are fused or sintered together as indicated at 21 in Figure 2, also the pellets adjacent the riser 17 are sintered to it. This may be accomplished by assembling the sprayed pellets and riser which preferably is composed of the same metal as the spray-deposited coatings, in a refractory container and applying pressure to them to hold them in contact with each other and with the riser and then heating the assembly to a temperature sufficient to locally fuse the contacting areas so that under the applied pressure they will cohere to each other forming a mass in which substantially all of the spray-deposited surfaces are in electrical circuit with each other.

Alternately the sintering operation can be accomplished as diagrammatically illustrated in Figure 3 by filling the refractory tubular member 22 with a number of the sprayed pellets 19 and applying spot-welded electrodes 23 and 24 to the ends of the mass of pellets. Pressure is then applied to the electrodes and an electric current caused to flow, the current resulting in the fusion of the spray-deposited metal at the points of contact and thus producing a conductive mass in which the spray-deposited layers are sintered together at their points of contact. Another method that may be employed is to assemble the pellets and then spray them, thus securing them together by the spray deposit. Similarly the spray deposit can be employed to join the pellets to the riser.

In Figure 4 I have shown a slightly modified form of my invention including a container 25 similar to the container 10 and provided with a closure 26 and a depending neck portion 27 through which the riser 28 extends. In this modification, however, the electrode comprises a perforated tubular member 29 having a large number of openings 30 therein for circulation of the electrolyte and having the bottom portion 31 to which the riser 28 may be riveted or welded.

The container is filled with sprayed pellets 32 similar to the pellets 19 heretofore described, but instead of having the pellets sintered together, the circuit is maintained by applying pressure to the pellets through or by means of the perforated cap 33 which is spun into engagement with the flanged upper end 34 of the tubular member 29.

It will be evident that in electrodes made according to my invention the area of spray-deposited metal is very large compared to the volume occupied by the electrode, and this large area is obtained by the use of a comparatively small amount of metal. The electrodes not only have porous active surfaces of spray-deposited metal but also the electrodes themselves are porous throughout their mass so that the electrolyte can permeate the electrodes and circulate therethrough. The electrodes are sturdy and contain no material which might contaminate the electrolyte. By my methods, the electrodes can be manufactured of economical materials to produce efficient devices at low cost.

The electrodes can be made in different forms from those shown and by utilizing different sprayed metals can be adapted for various types of electrolytic devices. It is therefore to be understood that my invention is not limited in its application to the electrolytic condensers specifically disclosed herein, but may be applied to various other electrolytic devices. Further, various changes and modifications can be made in my invention without departing from the spirit and scope thereof. Accordingly, it is to be understood that my invention is not limited to the preferred forms described herein or in any manner other than by the scope of the appended claims.

I claim:

1. An electrode for electrolytic devices comprising a mass composed of a plurality of pellets of insulating material of substantially uniform size, the surfaces of said pellets being coated with conductive metallic layers composed of minute particles, the pellets being many times larger than said particles, and a terminal member in circuit with the layers on substantially all of said pellets.

2. An electrode for electrolytic devices comprising a porous mass composed of a plurality of pellets of non-metallic base material, substantially all of the surfaces of substantially all of said pellets in the mass being coated with conductive metallic layers composed of finely divided cohering metallic particles, the thickness of the layers being small as compared to the diameter of the pellets, and a terminal member in circuit with the layers on substantially all of said pellets.

3. An electrode for electrolytic condensers comprising a porous mass composed of a plurality of pellets of porous material, the surfaces of said pellets being coated with conductive spray-deposited layers of film-forming metal, and a terminal member in circuit with the layers on substantially all of said pellets.

4. An electrode for electrolytic devices comprising a porous mass composed of a plurality of pellets of porous inert material the surfaces of said pellets being coated with conductive spray-deposited metallic layers and sintered together whereby the spray-deposited layers on substantially all of said pellets are in circuit with each other.

5. An electrode for electrolytic devices comprising a porous metallic container filled with a plurality of pellets of insulating material, the surfaces of said pellets being coated with conductive spray-deposited metallic layers.

6. An electrode for electrolytic devices comprising a porous container, a plurality of pellets having conductive surfaces of spray-deposited metal disposed within said container, and means for pressing the pellets within the container together.

7. An electrode for electrolytic devices comprising a porous mass composed of a plurality of pellets of insulating material, and a metallic terminal member extending into said mass, substantially all of the surfaces of said pellets being coated with conductive spray-deposited metallic layers, the thickness of the layers being small as compared to the diameter of the pellets, said mass and said terminal member being sintered together.

8. An electrode for electrolytic devices comprising a porous mass composed of a plurality of pellets of base material, and a metallic terminal member extending into said mass, substantially the surfaces of substantially all of said pellets being coated with conductive spray-deposited metallic layers, said mass and said terminal member being secured together by said spray-deposited layers.

9. In an electrolytic condenser having a container for electrolyte and a film-maintaining electrolyte therein, an electrode immersed in said electrolyte and comprising a porous mass made up of a plurality of pellets of insulating material each having adherent conductive surfaces of finely divided cohering particles of aluminum, the pellets being many times larger than said particles, and an aluminum terminal member in circuit with substantially all of said surfaces, said surfaces being provided with electro-formed dielectric films.

10. The method of making electrodes for electrolytic devices which includes the steps of providing a plurality of pellets of base material of substantially uniform size, spraying the surfaces of said pellets with finely divided particles of molten metal to provide a conductive layer thereon, and assembling a plurality of said pellets with the layers on substantially all of said pellets in circuit with each other.

11. The method of making electrodes for electrolytic devices which includes the steps of providing a plurality of pellets of base material of substantially uniform size, spraying the surfaces of said pellets with finely divided particles of molten metal to provide a conductive layer thereon, and sintering together a plurality of such pellets to form a porous mass.

12. The method of making electrodes for electrolytic devices which includes the steps of providing a plurality of pellets of base material of substantially uniform size, spraying the surfaces of said pellets with finely divided particles of molten metal to provide a conductive layer thereon, assembling a plurality of said pellets within an insulating container, applying pressure to said pellets and causing an electric current to flow through the assembly and thereby sintering the layers on said pellets together.

13. An electrode for electrolytic devices comprising a porous mass composed of a plurality of pellets of insulating material of from $\frac{1}{16}$ to $\frac{1}{4}$ inch in diameter, the surfaces of said pellets being coated with adherent conductive layers composed of minute cohering metallic particles, and a terminal member in circuit with the layers on substantially all of said pellets.

14. An electrode according to claim 13 wherein the coated pellets making up said porous mass are sintered together.

JOSEPH B. BRENNAN.